Sept. 21, 1937.  C. M. WEBER  2,093,899
METHOD AND MEANS FOR CONTROLLING FILM IN RECORDING AND REPRODUCING APPARATUS
Filed May 14, 1937
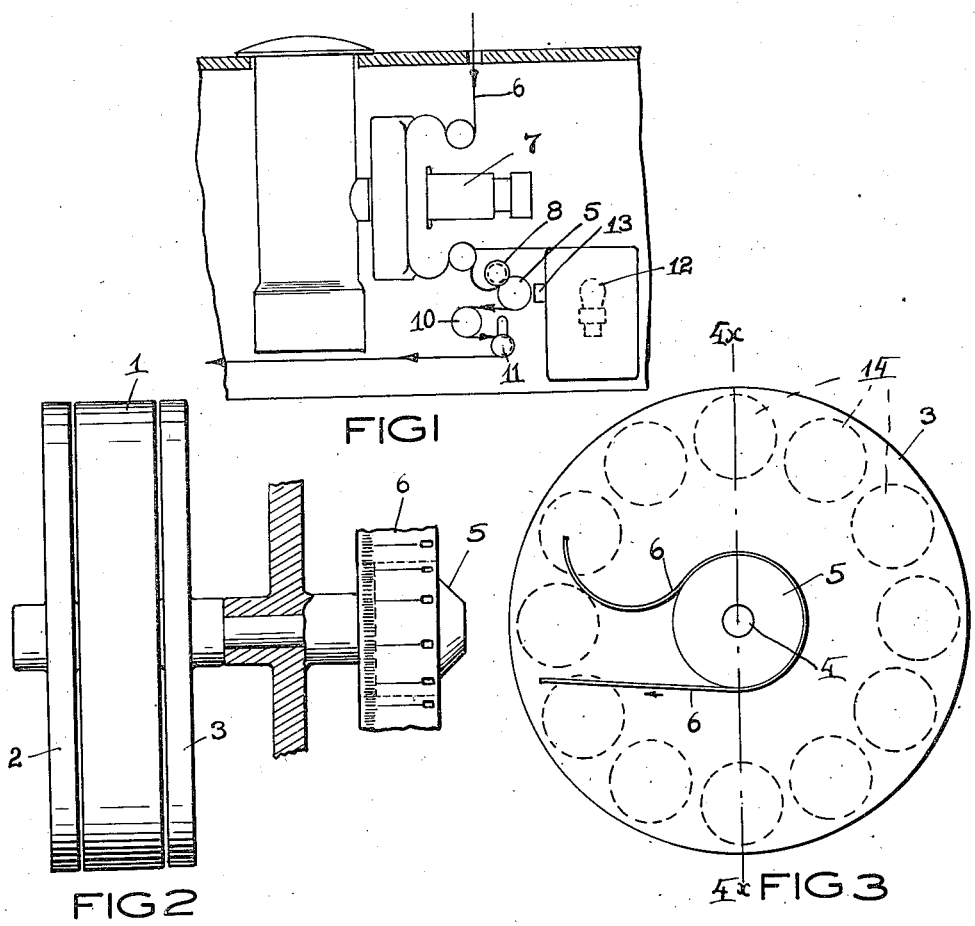
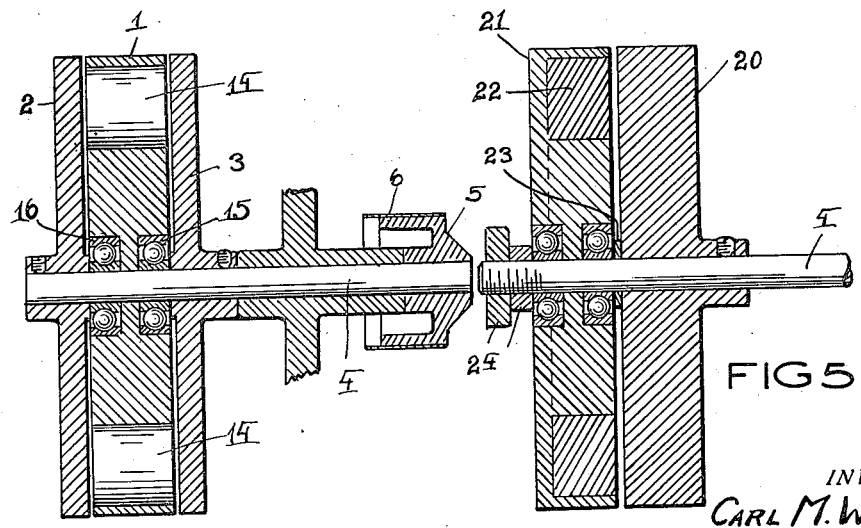
INVENTOR
CARL M. WEBER
BY
ATTORNEY Patented Sept. 21, 1937

2,093,899

UNITED STATES PATENT OFFICE 2,093,899

METHOD AND MEANS FOR CONTROLLING FILM IN RECORDING AND REPRODUCING APPARATUS

Carl M. Weber, Rochester, N. Y.

Application May 14, 1937, Serial No. 142,681

15 Claims. (Cl. 271—2.3)

This invention relates to the driving of film or other tape like material upon which acoustic or optical registration is to be recorded or printed, or from which such registration is to be reproduced.

In recording upon or reproducing from the sound track of a film, it is necessary that the speed of the film at the place of recording or reproduction be absolutely constant. The slightest variations in the speed of the film at the place of recording or reproduction, produce distortions in the reproduced sound that are highly undesirable.

It is, therefore, the principal object of this invention to provide novel method and means for automatically controlling the speed of the film so that it will have at all times a constant speed past a place of recording or reproduction.

This and other objects and attendant advantages of this invention will become more readily apparent from the detailed description which follows, reference being had to the accompanying drawing in which Figure 1 is a diagrammatic view of a moving picture film projector with sound reproducing means illustrating the position of the film drum over which a constant movement of the film is provided by my invention for a perfect reproduction of the sound from the film.

Figure 2 is an enlarged end view of the controlling members and the film drum with which they cooperate to control the movement of the film.

Figure 3 is a side elevation of the controlling members and film drum.

Figure 4 is a vertical cross section of the controlling members and the film drum, taken on the line 4x—4x of Figure 3.

Figure 5 is a vertical cross section of a modified form of the controlling members.

In the several figures of the drawing like reference numerals indicate like parts.

In order to avoid variations in the movement of film at the point of recording or reproduction, several different modes and means for controlling the movement of the film past such a point have heretofore been used without actually attaining perfect results. However, with my present invention this is made possible as the results obtained, especially in the reproduction of sound from film, by far exceed those of other controlling means now used.

Referring to the drawing, the controlling member comprises a freely mounted fly wheel 1 which is mounted between the two fixedly mounted fly wheels 2 and 3 on the governor shaft 4. The latter is suitably journaled in the frame of the apparatus and has keyed thereto the film drum 5. The film 6, as illustrated in Figure 1, enters the projector housing and is fed past the optical projector 7 by a suitable mechanism which forms no part of this invention.

After leaving this film feeding mechanism the film is fed in a loop onto the film drum 5 and is held thereagainst by the guide roller 8. The film then encircles the film drum 5 at a distance that will insure a good driving contact between the film and the drum, after which the film passes over the film sprocket 10 with which it is held in mesh by the tension roller 11. From the tension roller the film is rewound on a reel (not shown).

The point of reproduction of the sound record for the film is located at a point on the periphery of the film drum 5 where the film is held firmly wrapped against it by the action of the guide roller 8 and the film sprocket 10 in feeding the film over the film drum from the looped or loosely moving film section ahead of the film drum. A suitable light source 12 in combination with an optical system 13 is used for the translation of the sound film record but forms no part of this invention.

The frictional contact of the film in its travel over the film drum causes the rotation of the film drum 5 and rotates the shaft 4 and with it the pair of fly wheels 2 and 3 which are keyed or otherwise fastened thereto. These fly wheels are thus rotated in unison with the film drum to be driven by the film. The action of a unitary fly wheel alone on the movement of a member of inconsiderable mass, such as a film, is well known. In order to make such a fly wheel even partially effective, it must be of considerable weight and perfectly balanced and even then its controlling action on the film is imperfect.

In my present invention this has been overcome by dividing the governing action for the film between the two positively driven fly wheels 2 and 3 and the magnetically driven but otherwise loosely rotating fly wheel located between them. The latter has a non-magnetic body with permanent magnet inserts 14, 14 which extend coaxially from one face of the wheel to the other and are circularly grouped in the wheel near the periphery thereof and perfectly balanced therewith. A set of two ball bearings 15 and 16 antifrictionally support the wheel on the shaft 4 for a perfectly free rotation thereon.

The fly wheels 2 and 3 on each side of the fly wheel 1 have a body of magnetic material such as cast iron, steel, etc. and their sides, which face the fly wheel 1, are spaced according to the magnetic permeability of their body so that the magnetic lines of force of the permanent magnets 14 of the wheel 1 provide a uniform predetermined magnetic connection between all of the fly wheels and cause the fly wheel 1 to normally and uniformly rotate with the fly wheels 2 and 3 as long as the rotation of the fly wheels 2 and 3 is constant. As soon, however, as the fly wheels 2 and 3 momentarily tend to increase their speed, the freely mounted fly wheel 1 will continue at the originally constant speed and thus lag behind the fixedly mounted wheels and cause the yielding magnetic connection between them to resist such an increase in speed to keep the rotative speed of the film drum constant. The same will happen if the speed of the fly wheels 2 and 3 momentarily tends to slow up, in which case the freely mounted fly wheel 1 will continue at the original speed and cause the magnetic connection between it and the fixedly mounted fly wheels 2 and 3 to provide a pull on these fly wheels and to keep them at the normally constant speed.

As long as the film drum 5 is therefore rotated at a constant speed by a constant movement of the film over the drum by the film sprocket, all of the fly wheels rotate with the same constant speed. However, as soon as the film is moved irregularly, due to an irregularity in the driving mechanism of the film sprocket, the freely mounted magnetically connected fly wheel 1 will operate, as above described, to either exert a pull on the fly wheels 2 and 3 to prevent a lagging in the rotation of the film drum or produce a resistance to an increasing rotative speed of the fly wheels 2 and 3 and prevent an increase in the rotative speed of the film drum. The action of the separate and freely mounted fly wheel and its uniformly yielding magnetic connection with the positively driven fly wheels thus provides a perfect control on the film drum, so that any force influencing the uniformly constant speed of the film drum is counterbalanced by the freely mounted fly wheel 1, which keeps this drum and the movement of the film at an absolutely constant speed at all times.

The magnetic flux of the magnets in the fly wheel 1, the weight of this fly wheel and its spacing from the fly wheels 2 and 3 is such that the action of the fly wheel 1 on the fly wheels 2 and 3 will also eliminate any oscillation of the fly wheels 2 and 3. The fly wheels are substantially of the same weight, that is, the combined weight of the wheels 2 and 3, which are keyed to the shaft 4, is substantially equal to the weight of the freely mounted fly wheel 1.

In Figure 5, I have illustrated a form of my control in which but two wheels are used. In this form the fly wheel 20, which is of magnetic material, is keyed to the shaft 4 and alongside of it is freely mounted to rotate on suitable anti-friction bearings the fly wheel 21 of non-magnetic material having the permanent magnet insert 22 which, as illustrated in Figure 5, may be a ring shaped magnet.

The two wheels are suitably spaced and in order to make this spacing adjustable I provide a suitable spacing washer 23 between the wheels which may be replaced by a thinner or thicker washer to adjust the spacing between the two wheels. One or more adjusting nuts 24 are threaded to the end of the shaft to cooperate with the spacing washer 23 for the endwise adjustment of the fly wheel 21 on the shaft 4.

While I have described the wheels of magnetic material as being fixedly mounted on the shaft 4 and the wheel of non-magnetic material carrying the permanent magnets as being mounted to freely rotate on this shaft, it is understood that this arrangement may be reversed without departing from the spirit of the invention.

I claim:

1. The method of controlling the movement of a driven film band which consists in positively moving the film band and frictionally engaging the film band with a film drum and subjecting the film drum to a fly wheel action between fixed and loose fly wheels with a permanent magnetic connection between them.

2. A fly wheel arrangement for controlling the rotative movement of a journaled shaft comprising a fly wheel carried by said shaft so as to rotate therewith, a second fly wheel freely mounted on said shaft and a permanent magnetic connection between said fly wheels.

3. A fly wheel arrangement for controlling the rotative movement of a journaled shaft comprising a fly wheel of magnetic material carried by said shaft so as to rotate therewith, a second fly wheel of non-magnetic material freely mounted on said shaft alongside of said first fly wheel, and a permanent magnet insert in said second fly wheel to provide a uniform and constant magnetic connection between said first and second fly wheel.

4. A fly wheel arrangement for controlling the rotative movement of a journaled shaft, comprising a fly wheel mounted on said shaft so as to rotate therewith, a second fly wheel freely mounted on said shaft alongside of said first fly wheel, permanent magnets carried by one of said fly wheels for a permanent and constant magnetic connection between the fly wheels and means for adjusting the freely mounted fly wheel on said shaft for varying the magnetic connection between them.

5. A fly wheel arrangement for controlling the rotative movement of a journaled shaft comprising a pair of fly wheels of magnetic material spacedly carried by said shaft so as to rotate therewith, a third fly wheel of non-magnetic material freely mounted on said shaft between said pair of fly wheels, permanent magnetic inserts coaxially mounted in said third fly wheel and concentrically arranged therein so as to have uniform and constant magnetic connection with both of said pair of fly wheels.

6. In film recording or reproducing apparatus, driving mechanism for moving the film band, a film drum adapted to have the film band partially wrapped around it for frictional driving contact therewith, a fly wheel arrangement operatively connected with said film drum and comprising two wheels, one of said wheels being directly connected with said film drum and the other freely mounted alongside of said first wheel and permanent magnets carried by one of said fly wheels to provide a constant and permanent magnetic connection between said fly wheels.

7. In film recording or reproducing apparatus, driving mechanism for moving the film band, a film drum in frictional driving contact with said film band, a fly wheel of magnetic material rotatably connected with said film drum, and a second fly wheel of non-magnetic material freely mounted to rotate alongside said first fly wheel and a permanent magnet carried by said second fly wheel to provide a magnetic connection between said first and said second fly wheel.

8. In film recording and reproducing apparatus, driving mechanism for moving the film band, a film drum carried by a shaft so as to rotate therewith with the film band in frictional driving contact with the film drum, a fly wheel of magnetic material keyed to said shaft, a second fly wheel of non-magnetic material freely and adjustably mounted on said shaft, and a permanent magnet insert in said second fly wheel for magnetic connection between said first and said second fly wheels.

9. In film recording and reproducing apparatus, driving mechanism for moving the film band, a film drum carried by a shaft so as to rotate therewith with the film band in frictional driving contact with said film drum, a pair of fly wheels of magnetic material spacedly mounted and keyed to said shaft, a third fly wheel to non-magnetic material freely mounted on said shaft between said pair of fly wheels, and a permanent magnet insert in said third fly wheel for magnetic connection between said third fly wheel and said pair of fly wheels.

10. In film recording and reproducing apparatus, driving mechanism for moving the film band, a film drum carried by a shaft so as to rotate therewith with the film band in frictional driving contact with said drum, a pair of fly wheels of magnetic material spacedly mounted and keyed to said shaft, a third fly wheel of non-magnetic material freely mounted on said shaft between said pair of fly wheels, and a series of permanent magnet inserts in said third fly wheel with their poles facing said pair of fly wheels for magnetic connection between said third fly wheel and said pair of fly wheels on opposite sides thereof.

11. In film recording and reproducing apparatus the combination as set forth in claim 10 in which said permanent magnet inserts are coaxially mounted to said shaft and concentrically arranged in said third fly wheels.

12. In a film feeding mechanism, a drum engaging and driven by the film, a sectional inertia unit comprising a first inertia element rotatably connected with said drum and a second inertia element freely rotatable with reference to said first inertia element, one of said inertia elements being of non-magnetic material and including a permanent magnet and the other of said inertia elements being of magnetic material and spaced from the permanent magnet to provide a magnetic path of low magnetic reluctance between it and the permanent magnet to provide a resilient inertia torque for maintaining a substantially constant speed of said drum and movement of the film thereover.

13. In a film feeding mechanism, the combination of a shaft, a drum mounted on said shaft, means for imparting longitudinal motion to the film over and along the surface of the drum for rotating said drum, a sectional fly wheel comprising two fly wheel members, the first of said members being formed of magnetic material and being keyed to said shaft, the second of said fly wheel members being freely rotatably carried on said shaft and being formed of non-magnetic material, said second fly wheel member including a plurality of permanent magnets arranged symmetrically around the axis of said shaft, said fly wheel members being spaced a relatively short distance apart to provide a path of low magnetic reluctance between said permanent magnets and said first fly wheel member and a resultant resilient inertia torque for maintaining a substantially constant speed of said drum and movement of the film.

14. In a film feeding mechanism, a drum engaging and driven by the film, a sectional inertia unit comprising a first inertia element rotatably connected with said member and a second inertia element freely rotatable with reference to said first inertia element, one of said inertia elements being of non-magnetic material and including a plurality of permanent magnets arranged substantially symmetrically around the axis of rotation of said drum and said first inertia element, and the other of said inertia elements being of magnetic material and spaced from the permanent magnet a relatively short distance apart, each of said magnets having one of its poles directed toward and in close magnetic relation with said first inertia element.

15. In a film feeding mechanism, a film drum driven by the film, a sectional fly wheel comprising two inertia units of substantially equal mass, one of said inertia units rotatably connected with said drum and the other of said inertia units freely rotatable with reference to said first inertia unit, one of said inertia units being of non-magnetic material and including a permanent magnet and the other of said inertia units being of magnetic material and spaced from the permanent magnet to provide a magnetic path of low magnetic reluctance between it and the permanent magnet to provide a resilient inertia torque for maintaining a substantially constant speed of said drum and movement of the film thereover.

CARL M. WEBER.